Patented Aug. 30, 1927.

1,640,709

UNITED STATES PATENT OFFICE.

GUSTAVE P. METZ, OF BROOKLYN, NEW YORK.

MEDICINAL AGENT ADAPTED FOR GLANDULAR THERAPY.

No Drawing.   Application filed August 28, 1925.  Serial No. 53,078.

The invention relates to glandular preparations and is particularly adapted to bring about improved therapeutic effects.

The conception underlying the invention is that a glandular preparation when introduced into the tissues of the human body under conditions which retard the absorption of said preparation by the blood stream, produces different effects than when immediate absorption and distribution throughout the body, by means of the blood circulation takes place, and that these new effects result in a resemblance to the physiological gland action, highly desirable in therapy.

The invention may be carried out in a variety of ways and with numerous glandular preparations, but for the sake of a clear explanation of the invention, it will be described primarily in connection with a preparation of the insulin type.

In order to make the new preparation, a water soluble substance containing the active principle of the Langerhans' islands of the pancreas is produced or procured, preferably in powdered form wholly free from germs or bacterial products such as the material from which the aqueous solutions of the commercial preparations of the active principle of the Langerhans' islands of the pancreas are made. This powder is then mixed with or incorporated in a vehicle which retards absorption of the sugar-reducing substance (insulin) in the tissues of the body and maintains the deposit of such substance unchanged in the body tissues for an appreciable period of time. An illustrative composition would be, for example, 5 to 10 units of the active principle of the Langerhans' islands of the pancreas or any other substance able to produce a similar nerve effect in 1 cc. of vehicle. The resultant suspension is then put up preferably in ampules, sterilized, and sealed. Under given conditions it may be desirable to compound the preparation without in the first instance reducing the water-soluble sugar-reducing substances to powdered form. So long, however, as the preparation, irrespective of its special mode of production, comprises a vehicle which retards absorption of the sugar-reducing substances and contains the sugar-reducing substances in a state where they are absorbable by the tissues of the human body the result would be a preparation such as is intended to be covered by this application. This preparation, prepared as described, is administered in the usual way by subcutaneous, intracutaneous, or intramuscular injection. The administration of this new preparation produces results of marked superiority over the existing types of preparations of the active principle of the Langerhans' islands of the pancreas. This superior effect is apparently explainable by the fact that the new preparation produces primarily a nerve effect operative upon the liver rather than a hormone effect operative in the blood circulation system. The following is apparently a sound scientific explanation of the phenomena which take place with respect to my new preparation as contrasted with phenomena resulting from the use of the usual preparations of the active principle of the Langerhans' islands of the pancreas.

The action of such preparations is at present generally accepted as being primarily a hormone action which does not become effective before the preparation is absorbed into the blood stream. After this absorption has taken place a hormone action ensues whereby the blood sugar molecules in the blood stream are broken up. In order to accomplish this effect it is and has always been regarded as essential that the preparation of the active principle of the Langerhans' islands of the pancreas must be in a form which enables it to be readily and easily absorbed. Accordingly the customary or conventional form in which the preparation of the active principle of the Langerhans' islands of the pancreas is used is in a slightly acidulated aqueous solution, the function of the acid being that of a preservative of the effective activity of the solution. When this fluid is used, it is injected subdermally and the fluid possessing the absorptive properties described almost immediately enters the blood stream and there exercises its functions as described. The result of this treatment is that there is a lowering of the blood sugar contained in the blood and body fluids and this action is made use of in therapy to break down the increased amount of blood sugar in diabetic patients. This in turn causes the liver to replace the broken-up sugar by the formation of new sugar of the same type.

I have now found that a preparation of the active principle of the Langerhans' islands of the pancreas possesses a capacity for a two-fold action in the human body and that effects materially different from those above described can be obtained, provided its absorption into the blood stream can be postponed for a substantial period of time. In that case, the action of the substance consists of a nerve effect operative upon the liver. This nerve effect stimulates the liver to form glycogen and in forming glycogen sugar is not broken up, but is polymerized by the liver. This newly discovered action of the active principle of the Langerhans' islands of the pancreas or any other substance able to produce a similar nerve effect, thus has a reverse effect from that which takes place when it is used according to the known practice, i. e., the liver, instead of forming glucose, forms glycogen. In order to secure the benefits of the discovery, it is not possible to use the preparation of the active principle of the Langerhans' islands of the pancreas in its present-day commercial form by subcutaneous injection, because the water solution is absorbed too quickly to enable a nerve effect to become active on the liver of the patient. It is therefore necessary, in order to obtain the benefits of the new discovery, to make up a new preparation containing the active principle of the Langerhans' islands of the pancreas or any other substance able to produce a simliar nerve effect which shall have the function of resisting absorption for a considerable period of time while retaining in full the function of causing nerve effects. This can be accomplished by incorporating the active principle of the Langerhans' islands of the pancreas or any other substance able to produce a similar nerve effect, not with water, but with fatty material to the exclusion of water, and then injecting the fatty enveloped insulin particles as a fluid subcutaneously. When this is done a deposit of the active principle of the Langerhans' islands of the pancreas or any other substance able to produce a similar nerve effect remains unabsorbed in the tissues for an appreciable length of time and during that period of time it causes the described nerve effect with the result that the liver itself is stimulated rather than that a direct hormone action takes place in the blood stream. The stimulation of the liver will continue so long as this deposit remains unabsorbed in the tissues. In time, of course, absorption of the product itself takes place, but the amounts present at one and the same time in the circulation system will be so small that only a moderate hormone action can be said to be produced, not large enough to cause new sugar formation in the liver.

It will be observed that by injecting this new preparation as described, an entirely new and heretofore unknown effect is obtained, which is wholly unattainable by the use of insulin in its present known form. The new effect is superior to that thus far produced by insulin in its present soluble compositions in that it acts in a physiological manner and not as an artificial lowerer of the blood sugar.

While the foregoing theoretical considerations and explanations are apparently sound, they are merely presented as furnishing a possible explanation of the superior effect of the new preparation and not for the purpose of committing myself to any particular theory.

The specific vehicle which is to exercise the described retardant function may obviously be of several varieties. Palmitic substances, especially fats and oils, have been successfully used. Fatty substances, generally, provided they are sterile and free from germs and bacterial products and are preserved in this condition, are suitable and the same is true of equivalent substances, including olive oil, palmitic oils, or other oils provided they are of such a nature as to possess the properties necessary to exercise the retardant effect for a sufficiently long duration of time to permit the described benefits to be obtained.

I claim:

1. A medicinal agent comprising a glandular preparation wholly free from germs or bacterial products and in a state capable of being absorbable in the tissues of the human body, said preparation being incorporated in a vehicle acting as a retardant to delay for an extended period of time the absorption of the glandular preparation by the blood stream, said vehicle being substantially free from water and wholly free from germs or bcaterial products, said medicinal agent being adapted, upon intramuscular or subcutaneous injection, to exercise a functional effect in the human body via the nerves prior to directly effective chemically active contact with the blood stream.

2. A medicinal agent comprising a water-soluble sugar-reducing substance of the insulin type, wholly free from germs or bacterial products and in a state capable of being absorbable in the tissues of the human body, said substance being incorporated in a vehicle substantially free from water and wholly free from germs or bacterial products, but acting as a retardant to delay for an extended period of time the absorption of the insulin substance by the blood stream, the said medicinal agent being adapted, upon intramuscular or subcutaneous injection, to exercise a functional effect in the human body via the nerves prior to directly effective chemically active contact with the blood stream.

3. A medicinal agent comprising a water-soluble insulin powder, wholly free from germs or bacterial products and in a state capable of being absorbable in the tissues of the human body, said substance being incorporated in a vehicle substantially free from water and wholly free from germs or bacterial products, but acting as a retardant to delay for an extended period of time the absorption of the insulin substance by the blood stream, the said medicinal agent being adapted, upon intramuscular or subcutaneous injection, to exercise a functional effect in the human body via the nerves prior to directly effective chemically active contact with the blood stream.

In testimony whereof I have hereunto set my hand.

GUSTAVE P. METZ.